May 1, 1923.
G. F. SMITH
SYSTEM OF CONTROL
Filed Sept. 25, 1919
1,453,412
Fig. 1.
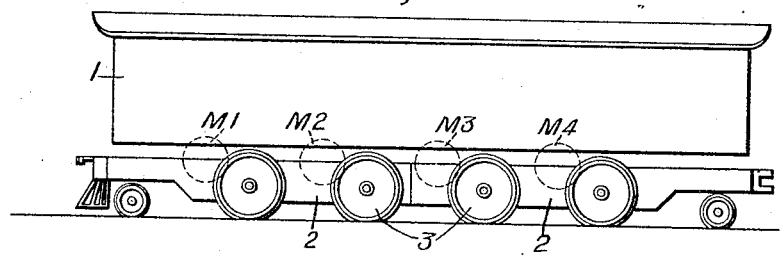
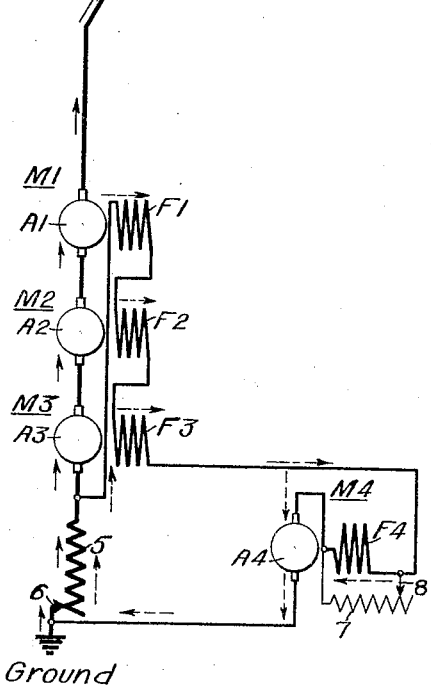
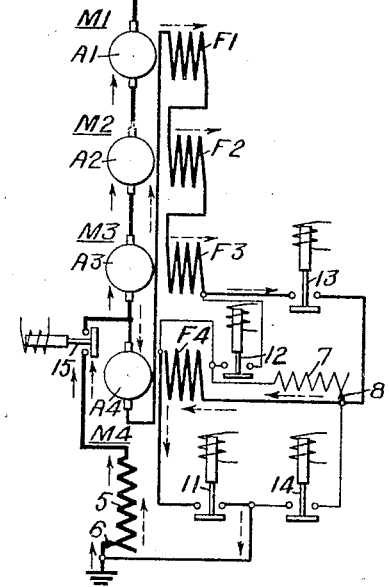
Fig. 4.
| Sequence of Switches. | 11 | 12 | 13 | 14 | 15 |
|---|---|---|---|---|---|
| Motoring |  | o |  | o |  |
| Transition | o | o | o | o | o |
| Regeneration | o |  | o |  | o |
WITNESSES:
J. A. Helsel
W. R. Coley
INVENTOR
Gerald F. Smith.
BY
Wesley J. Carr
ATTORNEY Patented May 1, 1923.

1,453,412

UNITED STATES PATENT OFFICE.

GERALD F. SMITH, OF WILKINSBURG, PENNSYLVANIA, ASSIGNOR TO WESTINGHOUSE ELECTRIC & MANUFACTURING COMPANY, A CORPORATION OF PENNSYLVANIA.

SYSTEM OF CONTROL.

Application filed September 25, 1919. Serial No. 326,354.

*To all whom it may concern:*

Be it known that I, GERALD F. SMITH, a citizen of the United States, and a resident of Wilkinsburg, in the county of Allegheny and State of Pennsylvania, have invented a new and useful Improvement in Systems of Control, of which the following is a specification.

My invention relates to systems of control for dynamo-electric machines, and it has special relation to the regenerative braking control of a plurality of electric railway motors, or the like, that are connected to, or adapted to drive, a common load.

One object of my invention is to provide a relatively simple and inexpensive regenerative braking arrangement that is particularly adapted for high-voltage direct-current operation, and wherein the necessity for an auxiliary exciting machine is obviated.

More specifically stated, it is the object of my invention to provide a regenerative-control system embodying a plurality of momentum-driven dynamo-electric machine armatures connected to a common load, one of the armatures being connected through all of the machine field windings to provide the necessary exciting current during the regenerative-braking period, together with an adjustable stabilizing resistor in the main circuit and also a variable shunt across the field winding corresponding to the exciting armature, whereby the regenerative braking effect may be controlled.

Another object of my invention is to provide a system of the above-indicated character wherein a plurality of switches, or the equivalent, are so connected to the armature and the field winding of the exciting machine as to permit transition from motoring to regeneration, or vice versa, while maintaining closed-circuit operation of the machines.

Other minor objects of my invention will become evident from the following detailed description taken in conjunction with the accompanying drawings, wherein Fig. 1 is an outline view of an electric locomotive embodying a plurality of driving motors to which my present invention may be applied; Fig. 2 is a diagrammatic view of a regenerative-control system organized in accordance with the present invention; Fig. 3 is a diagrammatic view of a modified form of the invention, including a plurality of switches whereby both the motoring and regenerative connections may be effected; and Fig. 4 is a sequence chart of a well-known form, serving to illustrate the order of operation of the vairous switches illustrated in Fig. 3, during the two types of machine operation.

Referring to Fig. 1 of the drawing, the structure here shown comprises an electric locomotive having a cab, or the like, 1 that is mounted upon a plurality of suitable trucks 2, and sets of driving wheels 3 which are adapted to be driven by means of a plurality of electric motors $M1$, $M2$, $M3$ and $M4$, through the agency of any well-known transmission mechanism.

Referring to the diagram of connections, Fig. 2, the illustrated system comprises suitable supply-circuit conductors Trolley and Ground; the several motors $M1$ to $M4$ inclusive, which are respectively provided with commutator-type armatures $A1$, $A2$, $A3$ and $A4$, and series-type field windings $F1$, $F2$, $F3$ and $F4$; a main-circuit translating device or stabilizing resistor 5 and an auxiliary-circuit translating device or variable shunt 7.

For regenerative operation, the armatures $A1$, $A2$ and $A3$ are connected, in series relation with the stabilizing or balancing resistor 5, across the supply circuit, while the remaining machine $M4$ is employed as an exciter for all of the field windings, being connected in a closed circuit including the stabilizing resistor 5 and the field windings $F1$, $F2$, $F3$ and $F4$. The latter field winding is reversed in connection with respect to that employed during motoring, in order to provide the desired generating or exciting effect.

The use of the stabilizing resistor 5 is not of my present invention, but is fully described and claimed in a patent granted to the Westinghouse Electric & Manufacturing Company in the name of Rudolf E. Hellmund, on April 1, 1919, No. 1,298,706. As indicated by the solid-line and the dotted-line arrows, respectively, corresponding to regenerative or load current and exciting current, the stabilizing resistor 5 is traversed in the same direction by these two currents during the regenerative braking period.

The exciter machine $M4$ will develop a braking effect in the other machines in proportion to the strength of the flux produced by the current traversing the field winding F4 and the value of the current flowing through the exciting armature A4. The exciting machine, during the braking period, will generate a substantially constant voltage having a definite ratio to the supply-circuit voltage. However, this ratio may be adjusted by varying the amount of the shunt or translating device 7 that is connected across the field winding F4, by means of any suitable switching device, which is conventionally represented at 8. Furthermore, the braking effect may be regulated at any time by varying the active amount of the stabilizing resistor 5 by means of a suitable switching device 6.

Referring now to Fig. 3, the system shown comprises the various elements that are illustrated in Fig. 2, together with a plurality of switches 11 to 15, inclusive, that are alternately employed to provide motoring and regenerative connections. As indicated in sequence chart, Fig. 4, when motoring operation is desired, the switches 12 and 14 are closed, whereby a series circuit is established from the Trolley through the armatures A1, A2, A3 and A4 and field windings F1, F2, F3, switch 12, field winding F4 and switch 14 to the negative supply-circuit conductor Ground. It will be understood that any well-known series-parallel control operation, or the like, of the illustrated motors, may be employed during the accelerating period, but, inasmuch as such operation is not relevant to the present invention, I have not deemed it necessary to illustrate any such complete control system here.

When it is desired to effect transition from motoring to regeneration, the switches 11, 13 and 15 are first closed, whereupon the switches 12 and 14 are opened, as indicated in the sequence chart. Under regenerative conditions, therefore, the main or load circuit, indicated by the solid-line arrows, is established from the supply-circuit conductor Ground, through the stabilizing resistor 5, switch 15 and armatures A3, A2 and A1 to the Trolley. The exciting or field-winding circuit is established from one terminal of the remaining armature A4 through the field windings F1, F2 and F3, switch 13, variable shunt 7 and field winding F4 in parallel relation, switch 11, stabilizing resistor 5, through which current flows in the same direction as that taken by the load current, and switch 15 to the negative terminal of the exciting armature A4.

The armature A4 is thus again connected to excite all of the field windings, the corresponding field winding F4 having been reversed to provide the desired operation. It will be noted that the entire transition from motoring to regeneration is accomplished while maintaining closed-circuit operation of the machines, and, furthermore, the reversed transition may also be accomplished without interrupting the motor circuits.

As in the previously-described system, the regenerative operation may be regulated by means of the switching devices 6 or 8, or both, thereby varying the active amounts of the resistors 5 and 7.

It will be seen that I have thus provided a regenerative-control system that is particularly adapted for high-voltage direct-current work, wherein one of the driving motors, which is connected to the same mechanical load as the remaining machines, is employed as an exciter, whereby the use of an auxiliary exciting machine is obviated, and the desired regulation of the braking effect may be readily obtained by means of a variable shunt across the field winding of the exciting machine or by varying a resistor in a circuit common to the regenerating and the exciting armatures.

I do not wish to be restricted to the specific circuit connections or arrangement of parts herein set forth, as various modifications thereof may be effected without departing from the spirit and scope of my invention. I desire, therefore, that only such limitations shall be imposed as are indicated in the appended claims.

I claim as my invention:

1. In a system of regenerative control, the combination with a plurality of momentum-driven dynamo-electric machine armatures connected to a common load, of a translating device connected in series relation with certain of said armatures, one of said armatures being connected through all the machine field windings across said translating device, and a second translating device connected in parallel relation to the field winding corresponding to said one armature.

2. In a system of regenerative control, the combination with a plurality of momentum-driven dynamo-electric machine armatures connected to a common load, one of said armatures being connected to excite all the machine field windings, of a translating device connected in series relation with all other armatures and also connected in said exciting circuit and a variable translating device connected in shunt relation to the field winding of the exciting machine.

3. In a system of regenerative control, the combination with a plurality of momentum-driven dynamo-electric machine armatures connected to a common load, of a resistor connected to receive the load current of certain of said armatures, one of said armatures being connected to send exciting current through all of the machine field windings and also through said resistor in the same direction as said load current, and a variable shunt for the field winding of the exciting machine.

4. In a system of regenerative control, the combination with a plurality of momentum-driven dynamo-electric machine armatures connected to a common load, means for close-circuiting one of said armatures and all of the machine field windings, a translating device connected in series relation with all other armatures and in circuit with said one armature and a variable shunt for the field winding corresponding to said one armature.

5. In a system of control, the combination with a plurality of dynamo-electric machine armatures connected to a common load, of a translating device, switching means including a plurality of alternatively employed switches for varying the connections of one of said armatures together with said translating device and of the corresponding field winding to effect transition from motoring to regeneration, or vice versa, while maintaining closed-circuit operation of the machine.

6. In a system of control, the combination with a plurality of dynamo-electric machine armatures connected to a common load, of a translating device, switching means for connecting one of said armatures through said translating device to excite all the machine field windings and for reversing the corresponding field winding to effect transition from motoring to regeneration while maintaining closed-circuit operation of the machines.

7. In a system of control, the combination with a plurality of dynamo-electric machine armatures connected to a common load, of a translating device, switching means for connecting one of said armatures through said translating device to excite all the machine field windings and for reversing the corresponding field winding to effect transition from motoring to regeneration while maintaining closed-circuit operation of the machine, and a variable shunt for said corresponding field winding.

8. The method of machine operation in a system comprising a plurality of series motors adapted to drive a common load, which consists in maintaining a series connection of a portion of the motor armatures and a resistor with the source of supply, connecting another portion of the motor armatures through said resistor to excite all the field windings, and shunting varying portions of the exciting current of the exciting portion of said armatures to control the braking effect.

9. The method of machine operation in a system comprising a plurality of series motors adapted to drive a common load, which consists in maintaining a series connection of all but one of the armatures and a resistor with the source of supply, connecting the remaining armature through said resistor to excite all the field windings, and shunting varying portions of the exciting current for said remaining armature to control the braking effect.

In testimony whereof, I have hereunto subscribed my name this 3rd day of Sept., 1919.

GERALD F. SMITH.